Aug. 23, 1932.   W. H. GOSCH   1,872,936
HOSIERY PACKAGE
Filed Aug. 10, 1931   4 Sheets-Sheet 4
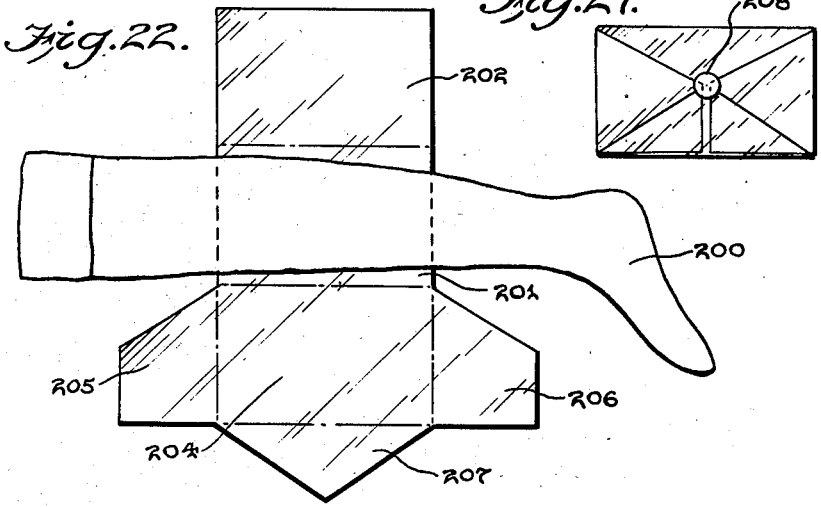
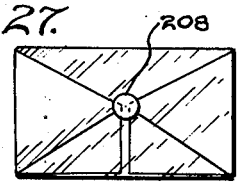
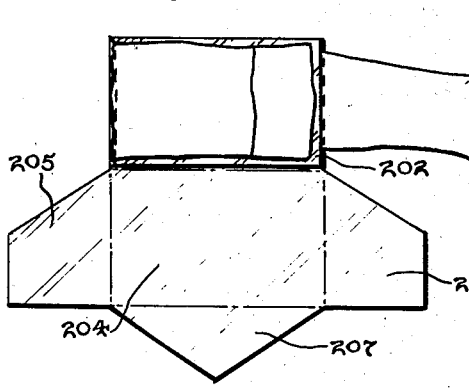
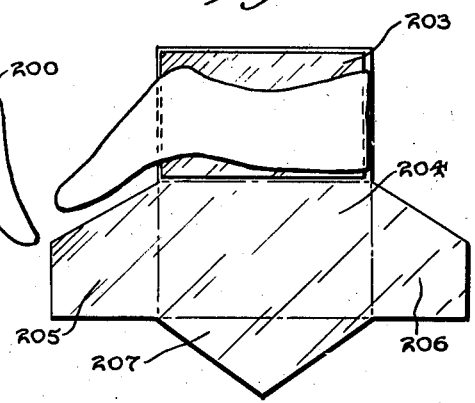
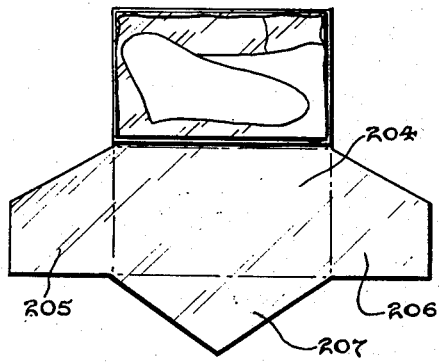
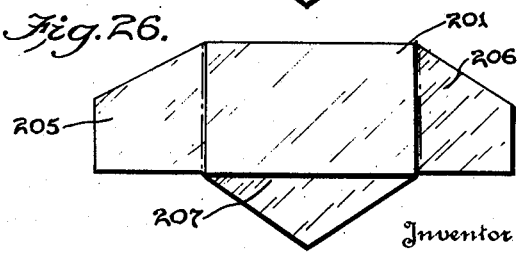

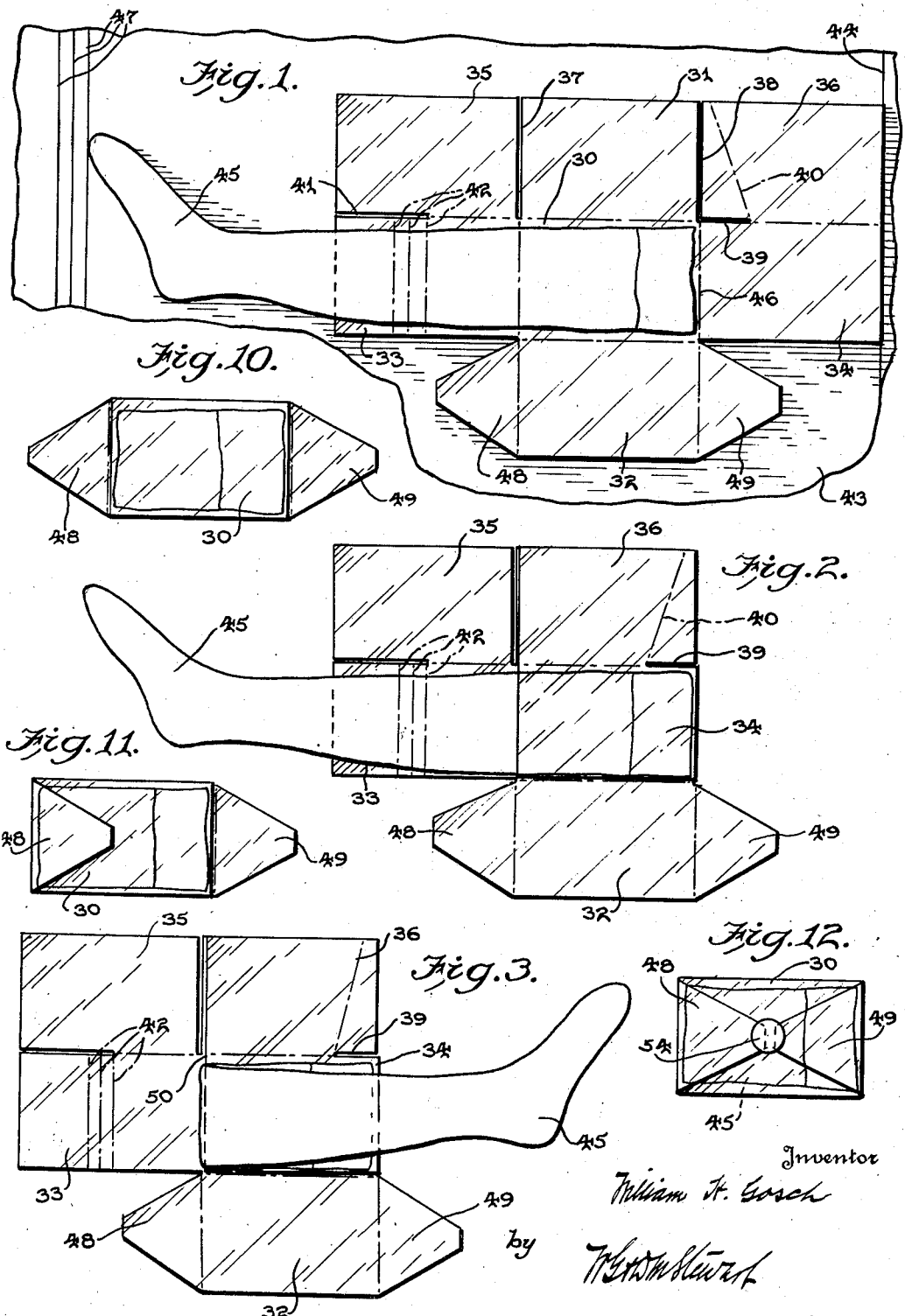

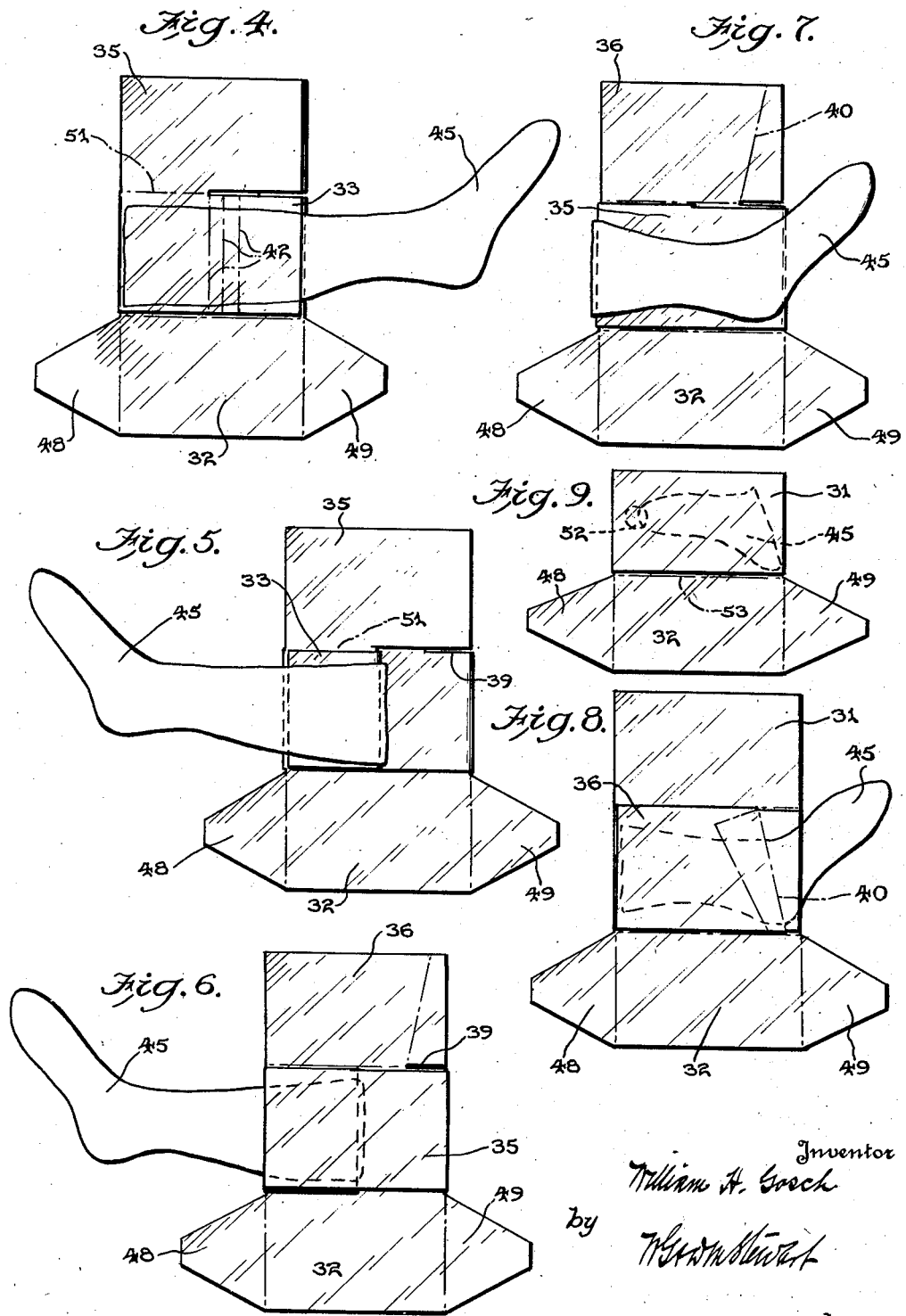

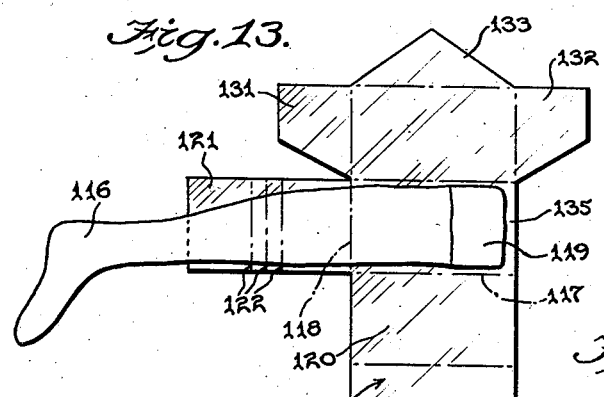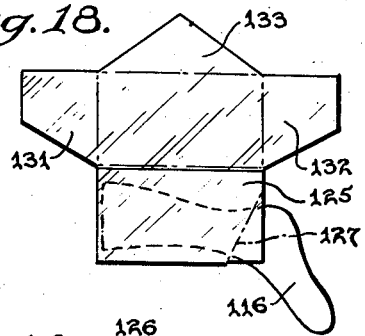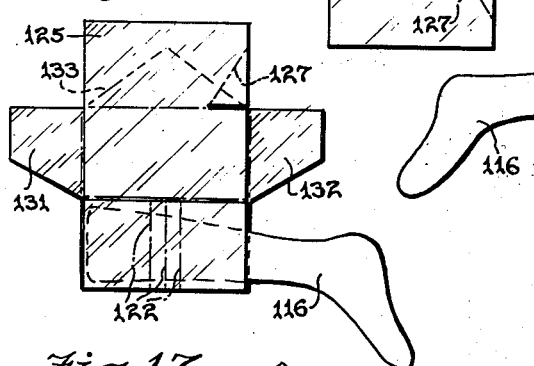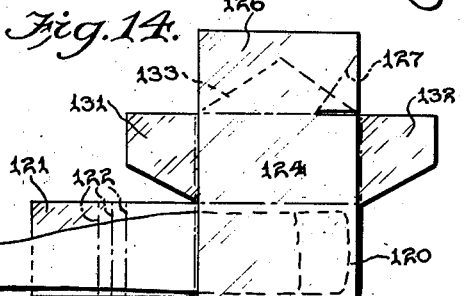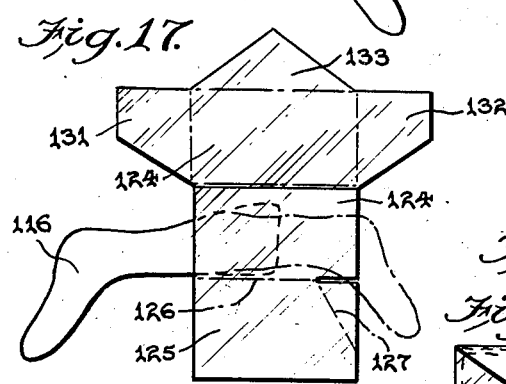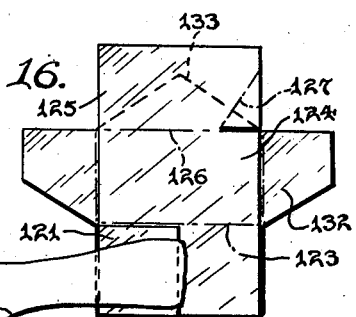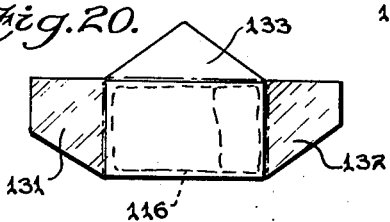

Patented Aug. 23, 1932

1,872,936

UNITED STATES PATENT OFFICE

WILLIAM H. GOSCH, OF READING, PENNSYLVANIA, ASSIGNOR TO THE NOLDE AND HORST COMPANY, OF READING, PENNSYLVANIA, A CORPORATION OF PENNSYLVANIA

HOSIERY PACKAGE

Application filed August 10, 1931. Serial No. 556,070.

This invention relates to improvements in hosiery packages.

One of the objects of the invention is to provide a transparent wrapper of cellophane or the like, in which a pair of lady's stockings may be folded by successively bending the stockings simultaneously with different leaves of the wrapper sheet interposed at each bend, so as to firmly hold the determined folds and display the foot structure at one side of the package and the leg top at the other side. The transparent package itself controls all parts of the stocking against wrinkling or shifting; excepting that the toe may be fastened by a "rider" (a pasted seal) to a portion of the wrapper.

Another object is to provide a wrapper of such shape that it may be folded in different ways to accommodate stockings of varying lengths, and yet always display the foot at one side and the leg top at the other side of the package.

With the foregoing objects outlined and with other objects in view which will appear as the description proceeds, the invention consists in the novel features hereinafter described in detail, illustrated in the accompanying drawings and more particularly pointed out in the appended claims.

In the drawings,

Fig. 1 is a plan view of a portion of an operating table showing one of the wrappers in flat condition, and a pair of stockings superposed on the same.

Figs. 2 to 9 inclusive are similar views respectively of the wrapper and stocking, and illustrating the successive folding steps.

Fig. 10 is a plan view of the package before the two end sealing flaps have been folded inwardly.

Fig. 11 is a similar view after one of the end flaps has been folded, and

Fig. 12 is a plan view of the complete package.

Fig. 13 is a view similar to Fig. 1, of another form of the wrapper with a pair of stockings superposed on the same, but with the operating table omitted.

Figs. 14 to 20 inclusive illustrate the successive steps employed in folding the stockings and wrapper shown in Fig. 13.

Fig. 21 is a plan view of the complete package of the second form of the invention.

Fig. 22 is a plan view of a third form of the wrapper with a pair of stockings resting on the same.

Figs. 23 to 26 inclusive illustrate the successive steps used in folding the wrapper and stockings shown in Fig. 22.

Fig. 27 is an elevation of the complete third form of the package.

Referring first to the embodiment of the invention illustrated in Figs. 1 to 12 inclusive, it will be noted that the preferred form of the wrapper comprises a middle panel 30 from which extend upwardly and downwardly projecting leaves 31 and 32. End leaves 33 and 34 also project in opposite directions from the middle panel, and the leaf 33 is integral with an upwardly extending leaf 35, while leaf 34 is integral with an upwardly extending leaf 36. The leaf 31 is separated from the leaves 35 and 36 by slits 37 and 38, and the slit 38 projects laterally at its lower end, as shown at 39, so that one end of the leaf 36 may be folded over along the bias line 40 for a purpose hereinafter described.

A slit 41, which extends only about half way between the leaves 33 and 35, enables the outer end portion of the leaf 33 to be folded along any one of the lines 42 to accommodate stockings of varying lengths. In other words, when the operator places the wrapper on the operating table 43, with one edge in register with a permanent line 44 on the table, and then places a pair of stockings 45 on the wrapper in such a manner that the top ends of the stockings will coincide with the fold line 46 of the wrapper, the toes of the stockings, depending on their length, will come into coincidence with either one of the gage lines 47 on the operating table, and this will guide the operator in the folding of the leaf 33. For instance, if the toes of the stockings register with the first one of the lines 47, then the operator, in folding the leaf 33 for that particular pair of stockings, will fold the leaf on the first one of the lines 42, that is, the one nearest the panel 30.

In addition, to the leaves heretofore mentioned, the wrapper includes sealing leaves 48 and 49.

Assuming the parts to be in the positions shown in Fig. 1, the operator first folds the leaves 36 and 34 over along the line 46 to bring the wrapper into the position shown in Fig. 2. Then the stockings are folded over along the edge 50, as illustrated in Fig. 3, so that a portion of the stockings is superposed on the leaf 34.

Now, as illustrated in Fig. 4, the leaves 35 and 33 are folded over so as to lie upon the stockings, and then a portion of the leaf 33 is folded upon the proper one of the lines 42 and then the stockings are bent backwardly over the folded leaf 33 and into the position shown in Fig. 5.

Now the leaf 35 is bent downwardly along the line 51, so as to overlie the leaf 33, as well as the stockings, as shown in Fig. 6. Then the stockings are folded backwardly so as to overlie the leaf 35 and to bring the parts into the position shown in Fig. 7. Now, the leaf 36 is folded over along the line 40, and this folded leaf is folded downwardly so as to overlie the stockings, as shown in Fig. 8. Then the foot portion of the stockings is bent backwardly along the fold line 40 so as to bring the foot into a position overlying the leaf 36, at which time the toes of the stockings may be secured to the leaf 36 by means of a "rider" 52, as shown in Fig. 9. Then the leaf 31 is folded downwardly into the position shown in Fig. 9, and finally, the folded stockings and the leaves and panel (within which they are wrapped) are folded along the line 53 of Fig. 9, so as to bring the leaf 31 into superposed relation with the leaf 32, as illustrated in Fig. 10. Then the sealing flap 48 is folded, as shown in Fig. 11, and finally the sealing flap 49 is folded, and the parts brought to the position illustrated in Fig. 12, at which time a seal 54 may be pasted to the adjacent ends of the sealing flaps to complete the package. In the complete package, as shown in Fig. 12, the tops of the stockings will appear at one side of the package, and the feet of the stockings will appear at the opposite side of the package. Furthermore, as the wrapper is made of transparent material, one inspecting the package can not only view the tops and feet of the stockings, but the edges of the same, and as the stockings are folded with the wrapper, they are held against wrinkling or shifting, and the stockings are always neatly displayed while maintained out of contact with the inspector's fingers.

In the form of the invention illustrated in Figs. 13 to 21 inclusive, the transparent wrapper 115, after a pair of stockings 116 has been superposed on the same, is folded along the line 117 to bring the wrapper into the position shown in Fig. 14. Then the stockings, as well as the wrapper, are folded on the line 118 to bring the parts into the position shown in Fig. 15. This movement causes the leg tops 119 of the stockings to be covered by the portion 120 of the wrapper. Now the flap 121 of the wrapper is bent over on itself along one of the lines 122, the fold here being governed by the position of the stockings relatively to the gage lines on the operating table. In this instance, as the toes of the stockings, in the beginning, register with the middle one of the gage lines 47, the fold at 122 will be made along the middle one of those lines. This will bring the parts into the position shown in Fig. 16. Now, the wrapper is folded along the line 123 to bring the portion 124 directly over the folded stockings, as indicated in Fig. 17, at which time the stockings are folded over the portion 124 from the full line position in Fig. 17 to the dotted line position. Afterwards, the portion 125 of the wrapper is bent upwardly along the line 126, so as to cover the folded stockings, and this brings the parts to the position shown in Fig. 18. Now, the corner of the part 125 is folded on the bias line 127, so that the parts assume the position shown in Fig. 19, at which time the feet 128 of the stockings are directly superposed on the portion 125. Next, the wrapper is folded on the line 129, so as to place the feet against the face portion 130 of the wrapper. This fold is illustrated in Fig. 20. Then the end flaps 131 and 132 are folded, and finally, the main flap 133 is folded, and then these outside flaps may be secured in position, and the package will appear as illustrated in Fig. 21.

For cheaper grades of stockings, the simpler form of the wrapper illustrated in Figs. 22 to 27 inclusive, may be employed, but in such case, both the tops of the stockings, as well as the feet, will be displayed on the same side of the package, instead of on opposite sides thereof, as in the first and second forms of the invention. Referring to this third form of the package, it will be observed in Fig. 22 that a pair of stockings 200 is first superposed on the wrapper with the medial portions of the stockings resting on the intermediate panel 201 of the wrapper. Then the leaf 202 is folded downwardly so as to overlie the stockings. Then the stocking tops are folded over this leaf, as illustrated in Fig. 23. At such time, a transparent insert or divider 203 can be placed over the stocking tops, and then the lower portions of the stockings may be folded over on to this insert as illustrated in Fig. 24, so as to bring the parts into the position shown in Fig. 25.

At this point it will be noted that the insert 203 may be an integral part of the wrapper. For example, it might be a leaf extending to the left from the main panel 201.

When the parts are in the position shown in Fig. 25, the interfolded stockings and panels are folded downwardly on to the panel 204 to bring the parts into the position shown in Fig. 26. Now the sealing flaps 205, 206 and 207 can be folded on to the panel 201, as illustrated in Fig. 27, and finally the package may be closed by a pasted seal 208.

It will be understood from the foregoing that the folding of the wrapper and stockings is conducted in such manner that the leg top portions, feet and edges of the stockings will be fully displayed, and due to the wrapper being folded with the stockings, the latter will always remain in their original folded position, and there will be no shifting of the stockings, such as would result in an unsightly package.

From the foregoing it is believed that the invention may be readily understood, and it is apparent that changes may be made in the details disclosed, without departing from the spirit of the invention, as expressed in the claims.

What is claimed and desired to be secured by Letters Patent is:

1. A hosiery package comprising a wrapper of transparent flexible material and a pair of stockings, the wrapper being folded with the stockings so as to place transparent stiffening panels of the wrapper between sub-adjacent folded portions of the stockings and to provide transparent covering throughout, and with leg-top and foot portions of the stockings visible through the wrapper.

2. A hosiery package comprising a wrapper of transparent flexible material and a pair of stockings, the wrapper being folded with the stockings so as to place transparent stiffening panels of the wrapper between sub-adjacent folded portions of the stockings and to provide transparent covering throughout, and with leg-top and foot portions at opposite faces of the wrapper.

3. A hosiery package comprising a wrapper of transparent flexible material and a pair of stockings, the wrapper being folded with the stockings so as to place panels of the wrapper between sub-adjacent portions of the stockings, the leg-top of the stockings being visible at one side of the wrapper, and the feet of the stockings being visible at the other side of the wrapper, one of the leaves of the wrapper having variable fold lines to accommodate stockings of different lengths.

4. A hosiery package comprising a wrapper of transparent flexible material and a pair of stockings, the wrapper being folded with the stockings so as to place panels of the wrapper between sub-adjacent portions of the stockings, the leg-top of the stockings being visible at one side of the wrapper, and the feet of the stockings being visible at the other side of the wrapper, the leaf of the wrapper on which the feet portions of the stockings rest having one of its corners folded on the bias.

5. A stocking wrapper comprising a blank of transparent flexible material and comprising a plurality of leaves integrally connected by fold lines, one of the leaves having one of its corners folded on the bias, an end one of the leaves being provided with end flaps and a main flap, and a panel next to the last mentioned leaf being provided with a leaf of about the same length as the panel, the last mentioned leaf having variable fold lines intermediate its ends.

6. A stocking wrapper consisting of a blank sheet of transparent flexible material forming a panel and leaves, one end of the wrapper being slit and having a corner folded over along a diagonal line, one of the leaves having end flaps and a main flap, and a leaf next to the panel having a projecting leaf provided with varying fold lines.

7. A method of packaging hosiery, including placing a pair of stockings on a double panel portion of a transparent wrapper, folding the wrapper and stockings in such manner as to display the tops of the stockings at one side of the wrapper and the feet of the stockings at the opposite side of the wrapper, and finally sealing the package.

In testimony whereof, I affix my signature.

WILLIAM H. GOSCH.